(12) United States Patent
Searer et al.

(10) Patent No.: US 10,252,591 B1
(45) Date of Patent: Apr. 9, 2019

(54) METHOD AND APPARATUS FOR ELECTRIC TONGUE JACK

(71) Applicants: Craig A. Searer, Elkhart, IN (US);
Randall J. Clay, Elkhart, IN (US);
David W. Busch, South Bend, IN (US)

(72) Inventors: Craig A. Searer, Elkhart, IN (US);
Randall J. Clay, Elkhart, IN (US);
David W. Busch, South Bend, IN (US)

( * ) Notice: Subject to any disclaimer, the term of this patent is extended or adjusted under 35 U.S.C. 154(b) by 34 days.

(21) Appl. No.: 15/052,652

(22) Filed: Feb. 24, 2016

Related U.S. Application Data

(60) Provisional application No. 62/120,137, filed on Feb. 24, 2015.

(51) Int. Cl.
*B66F 3/08* (2006.01)
*B60D 1/66* (2006.01)

(52) U.S. Cl.
CPC . *B60D 1/66* (2013.01); *B66F 3/08* (2013.01)

(58) Field of Classification Search
CPC ...... B66F 5/025; B66F 7/025; B66F 2700/04; B66F 3/08; B66F 9/02; B66F 9/04
USPC .................................................. 254/8 B, 13
See application file for complete search history.

(56) References Cited

U.S. PATENT DOCUMENTS

| | | | | |
|---|---|---|---|---|
| 1,518,490 A * | 12/1924 | Dixon | ................. | B66F 3/08 254/102 |
| 3,797,800 A * | 3/1974 | Loy | ................. | E02D 27/02 249/13 |
| 5,262,706 A * | 11/1993 | Hollingsworth | ....... | B21J 13/085 254/126 |
| 6,601,827 B1 * | 8/2003 | Arzouman | ................. | B66F 3/12 254/126 |
| 7,100,898 B1 * | 9/2006 | Chang | ................. | B66F 3/12 254/126 |
| 7,163,312 B2 * | 1/2007 | Woodyard | ................. | F21L 4/08 362/109 |
| 7,771,155 B2 * | 8/2010 | Thiel | ................. | B25H 1/0014 187/214 |
| 8,632,055 B2 * | 1/2014 | Lee | ................. | B66F 5/04 254/1 |
| 10,065,842 B2 * | 9/2018 | Jaipaul | ................. | B66F 3/46 |
| 2001/0052592 A1 * | 12/2001 | Alvarado | ................. | B66F 3/18 254/13 |
| 2002/0116881 A1 * | 8/2002 | Zimmerman | ................. | B66F 3/10 52/126.6 |
| 2004/0219002 A1 * | 11/2004 | Lenaers | ................. | B66F 7/025 414/459 |
| 2014/0097568 A1 * | 4/2014 | Matsumoto | ................. | B66F 7/025 269/58 |

(Continued)

*Primary Examiner* — Joseph A Dillon, Jr.
(74) *Attorney, Agent, or Firm* — Rick B. Yeager (57) ABSTRACT

An improved electric tongue jack with one or more memory buttons to retract or extend to a predetermined desired height. A first memory button is provided to engage in a memorizing operation to store a desired actual height of the hitch. When the first memory button is subsequently engaged, the motor gear assembly is controlled to return the hitch to the desired height. A second memory button is used as an automatic retraction for the jack leg once the trailer has been set on the hitch ball/tow vehicle. Once the auto retract location has been set, the user may push the auto retract button once and the leg will automatically retract to the preset height. The memory buttons are controlled by software in a printed circuit board inside the head of the jack.

9 Claims, 6 Drawing Sheets

(56) References Cited

U.S. PATENT DOCUMENTS

2015/0137055 A1\* 5/2015 Ong ........................ B66F 5/025
 254/7 B
2015/0246797 A1\* 9/2015 Jaipaul ...................... B66F 3/46
 700/225

\* cited by examiner

METHOD AND APPARATUS FOR ELECTRIC TONGUE JACK

This US non-provisional patent application is related to U.S. Provisional Patent Application No. 62/120,137 filed Feb. 24, 2015 by applicants, and claims the benefit of that filing date.

BACKGROUND

Field of Invention

The current invention relates to an apparatus and method for an improved electric tongue jack with one or more memory buttons to retract or extend to a predetermined desired height.

Prior Art

Figure 1:
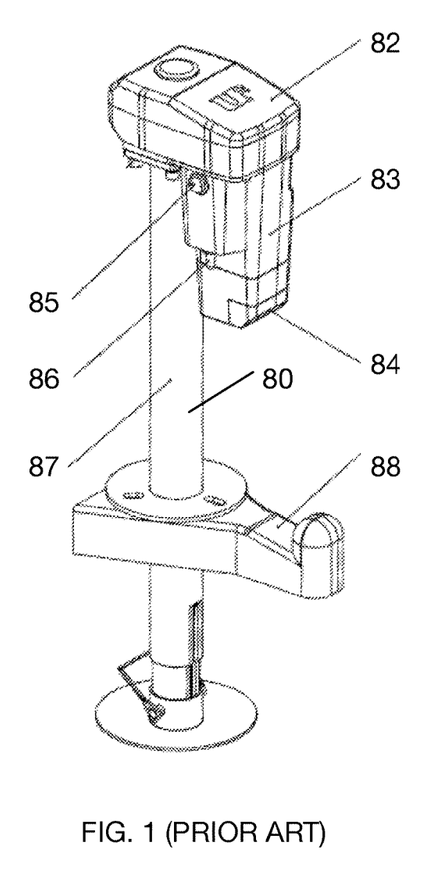
FIG. 1 is a side perspective view of a prior art electric tongue jack.

FIG. 1 is a side perspective view of a prior art electric tongue jack 80 showing a main gear cover 82, motor housing 83, light lens 84, light switch 85, motor switch 86, outer tube 87, and tongue 88. In this example, the jack lifts a trailer hitch to a desired height. The operator engages the motor switch 86 to activate the jack motor until the hitch is raised to a desired height; and then disengages the motor switch.

SUMMARY OF INVENTION

In one embodiment of the current invention, a first memory button is provided. The first memory button is engaged in a memorizing operation to store a desired actual height of the hitch. When the memory button is subsequently engaged, the motor gear assembly is controlled to return the hitch to the desired height.

In another embodiment of the current invention, a second memory button is provided in combination with the first memory button. The second memory button is used as an automatic retraction for the jack leg once the trailer has been set on the hitch ball/tow vehicle. Once the auto retract location has been set, all the user has to do before moving the trailer is to push the auto retract button once and the leg will automatically retract to the preset height. The user will not have to stand next to the jack and keep the retract control pressed. Both of the memory buttons are controlled by software in a printed circuit board inside the head of the jack.

DETAILED DESCRIPTION OF EMBODIMENT

FIGS. 2-6 show an example of a Phoenix 4000™ Electric Tongue Jack with a memory button. The jack is designed to replace the existing jack for use such as on travel trailers, boat trailers, and cargo trailers. The jack is typically installed with the motor head facing forward or toward the driver's side of the tow vehicle.

Figure 2:
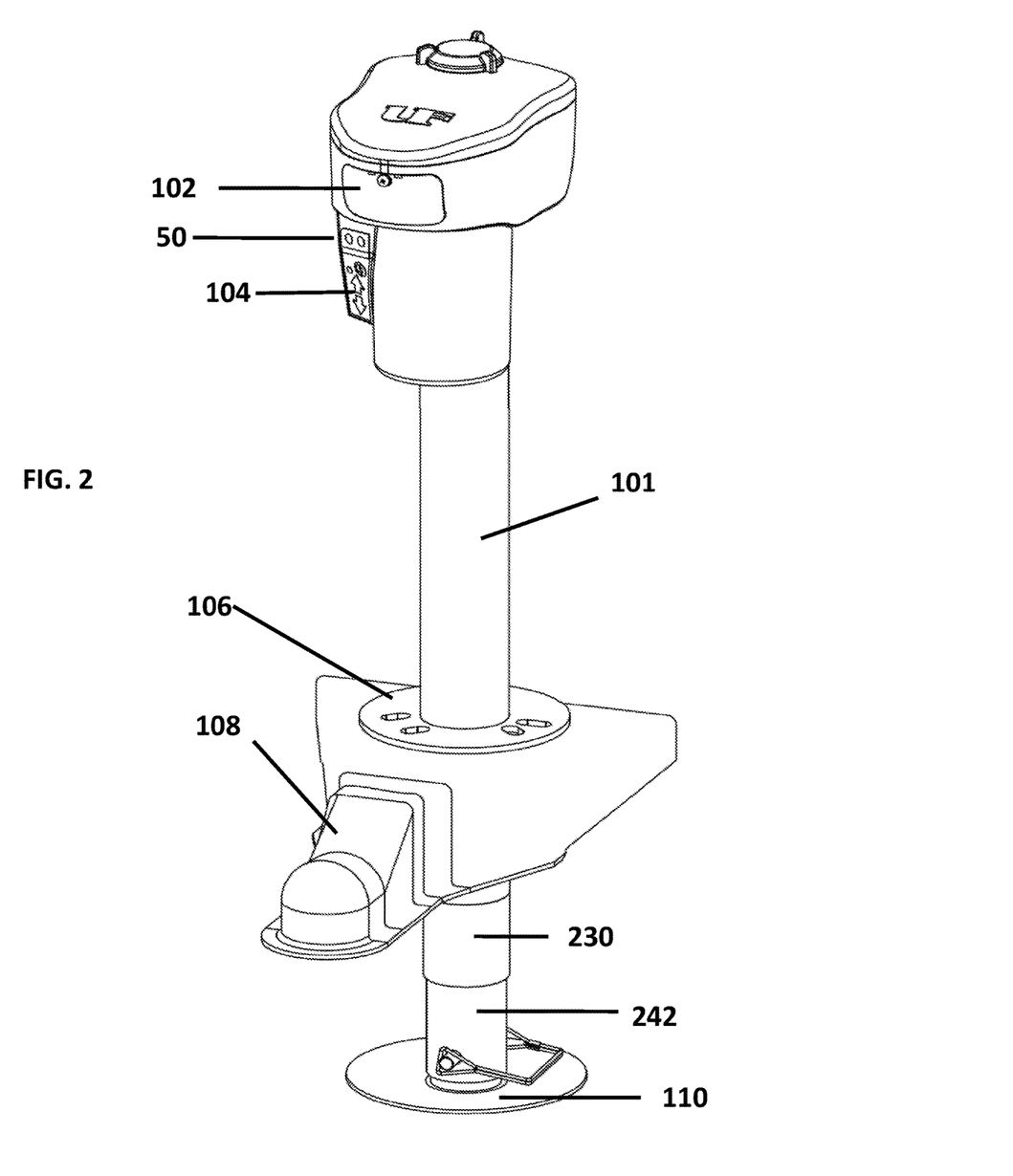
FIG. 2 is a front perspective view of an electric tongue jack with a first memory button.

FIG. 2 is a front perspective view of an electric tongue jack 101 with a first memory button 50. In this example, the electric tongue jack also includes a light 102, a touch pad 104, a mounting flange 106, a tongue 108, a footpad 110, an outer tube 230, and an inner tube 242.

Figure 3:
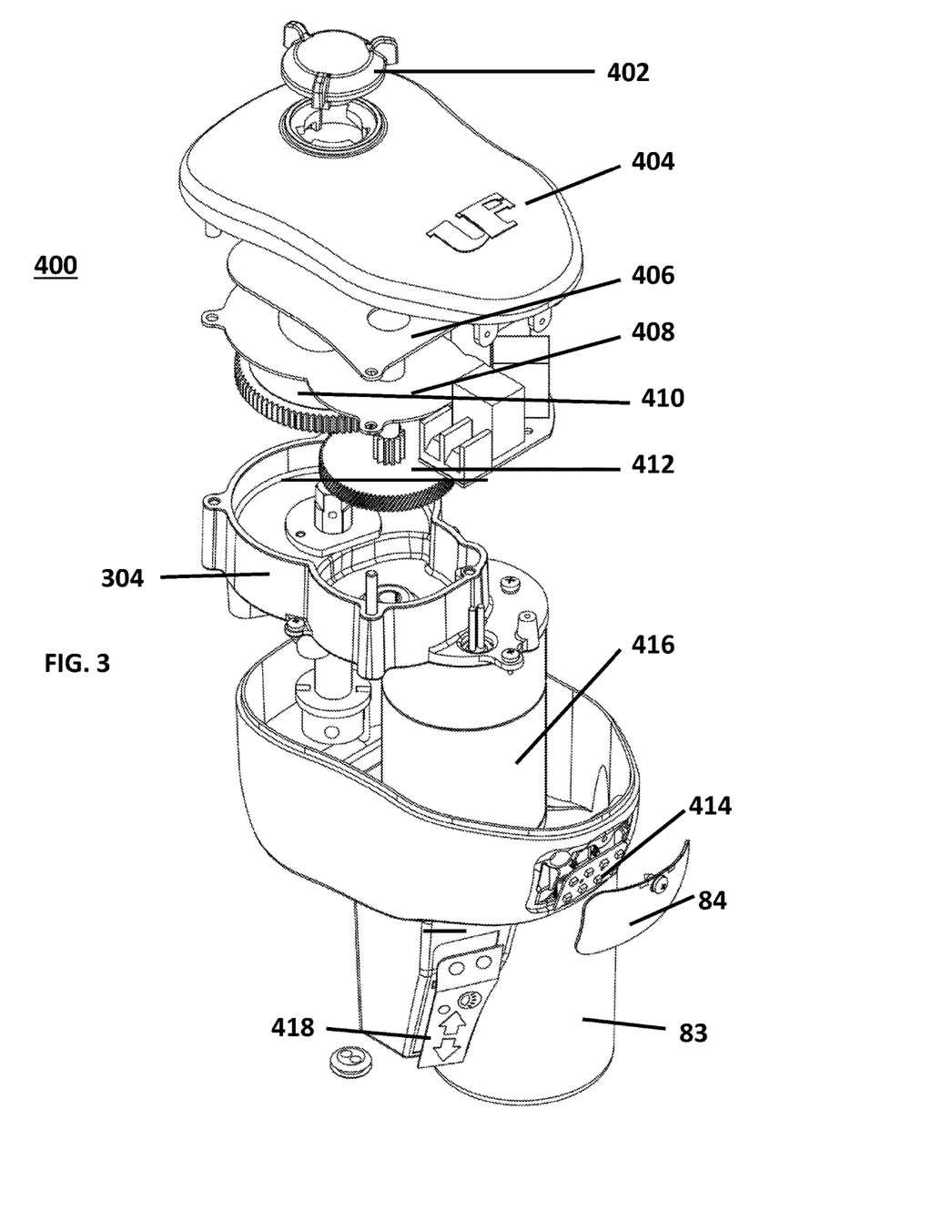
FIG. 3 is an exploded side perspective view of the motor/gear assembly of the electric tongue jack of FIG. 2.

FIG. 3 is an exploded side perspective view of the motor/gear assembly 400 of the electric tongue jack of FIG. 2. In this example, the motor gear assembly includes a twist plug 402, a housing cover 404, a circuit board 406, a gear box cover 408, a drive gear 410, a bevel gear assembly 412, a light 414, a motor 416, a lens 84, a motor housing 83, and a keypad 418.

Figure 4:
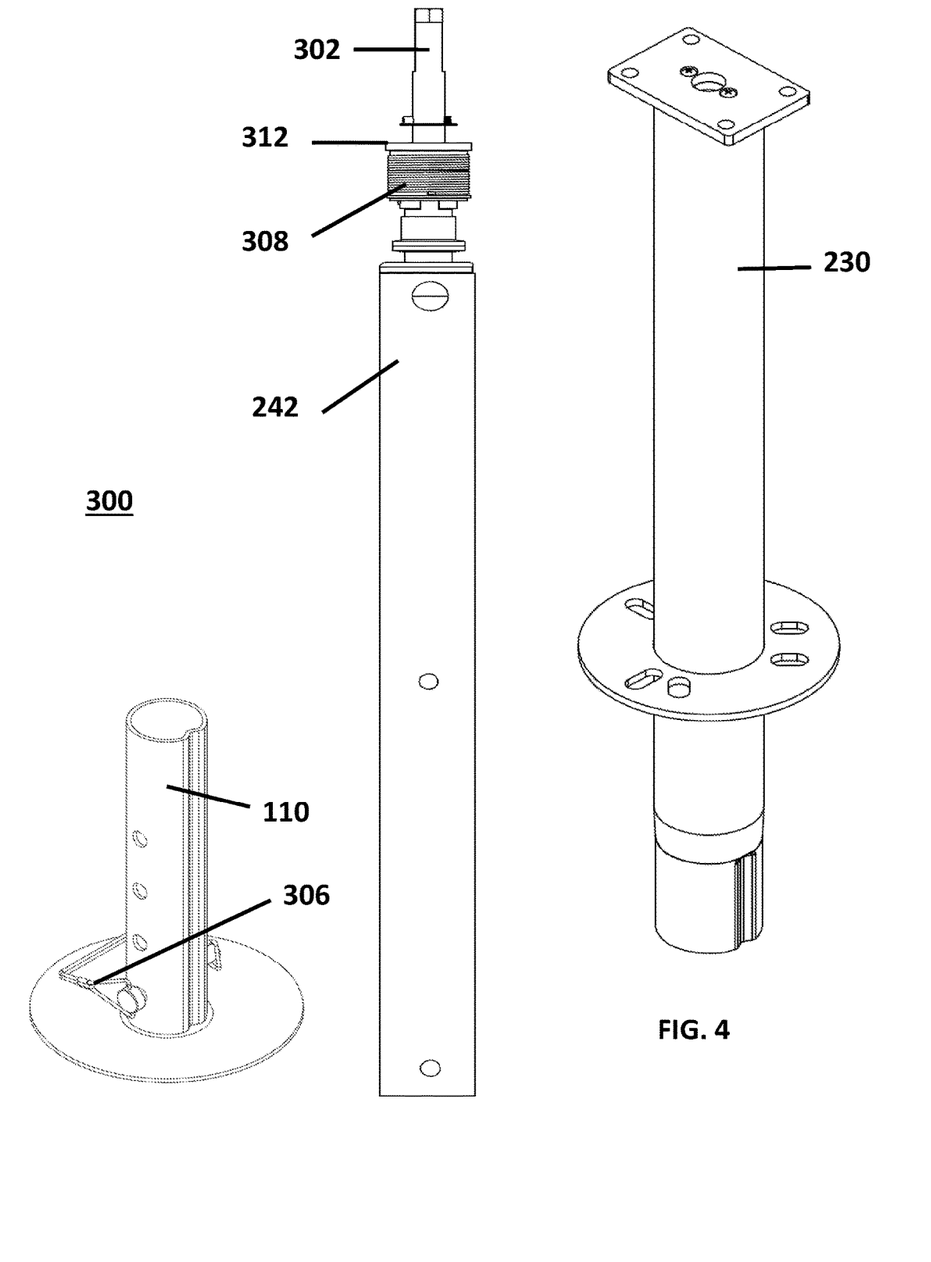
FIG. 4 is an exploded side perspective view of the lower stem assembly of the electric tongue jack of FIG. 2.

FIG. 4 is an exploded side perspective view of the lower stem assembly 300 of the electric tongue jack of FIG. 2. In this example, the lower stem assembly includes a memory button 50, a collar 302, a gear box 304, an outer tube 230, a wire lock pin 306, an adjustable footpad 110, an inner tube 242, a ball screw set 308, a clutch assembly 310, and a friction washer 312. A manual override socket, fuse holder, and fuse are not shown.

Figure 5:
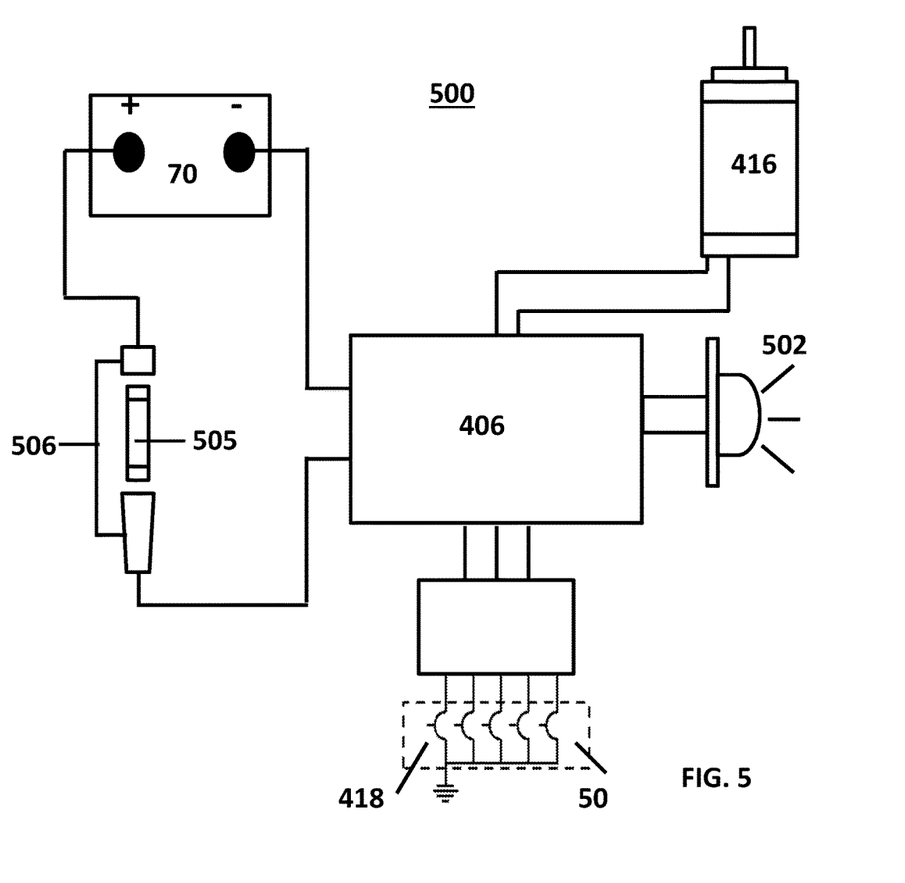
FIG. 5 is a wiring diagram for the electric tongue jack of FIG. 2.

FIG. 5 is a wiring diagram for the electric tongue jack of FIG. 2. In this example, the wiring 500 includes the circuit board 406, the keypad 418, the first memory button 50, an LED light 502, the motor 416, a battery 70, a fuse 505, and a fuse holder 506.

Figure 6:
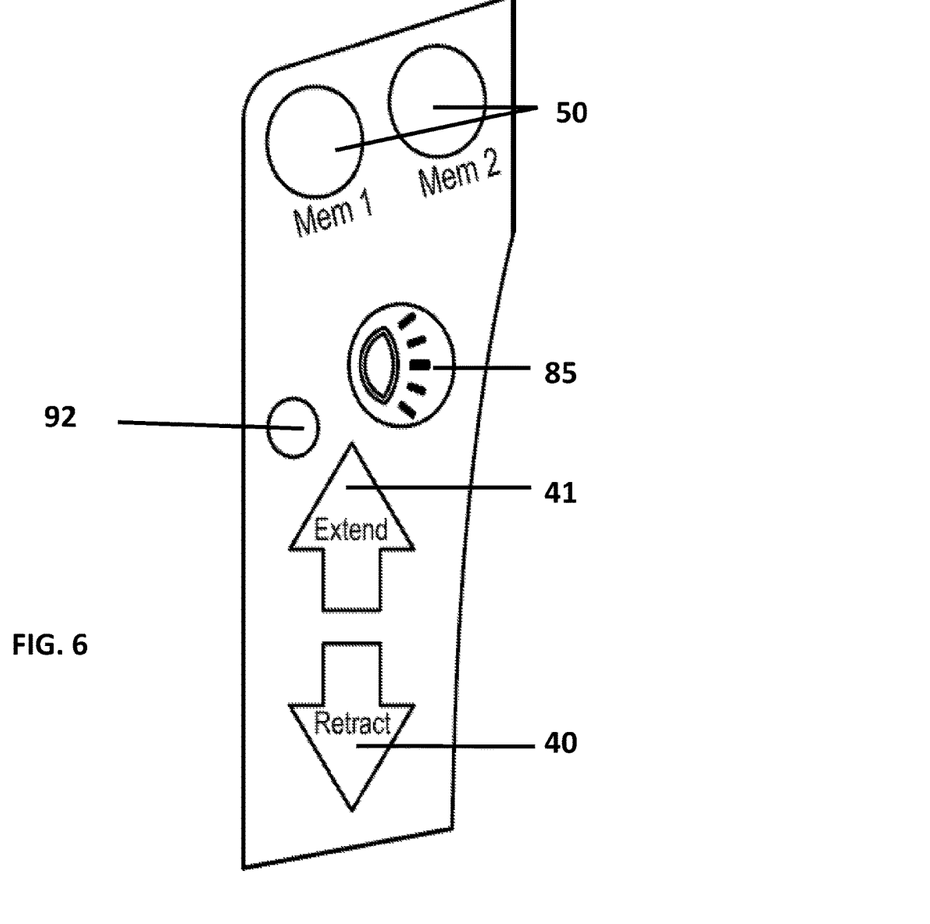
FIG. 6 is a diagram showing a control panel and memory button for the of the electric tongue jack of FIG. 2.

FIG. 6 is a diagram showing a control panel and memory button for the of the electric tongue jack of FIG. 2 showing a green/red calibration indicator light 92; extend button 40, retract button 41, light switch 85, and memory button 50.

The jack is operated by means of controls provided on a touch keypad 418 adjacent to the motor housing. To extend the jack, the EXTEND button is pushed. To retract the jack, the RETRACT button is pushed. In normal operation, a green light 602 remains on while the jack is in an extend or retract operation.

In this example, a 12 volt DC electric motor 416 drives a jack screw to move the inner tube tube 242 down when the "EXTEND" control button 640 on keypad 418 is engaged; and to move the inner tube up when the "RETRACT" control button 641 on keypad 418 is engaged.

If a red light flashes quickly for 3 seconds, then a high amp situation exists, and the jack will turn off for 3 seconds. The jack will reset itself in five (5) seconds and can be used again until a high amp situation occurs.

The jack may be used in manual operation by Disconnecting the fuse (unscrew and pull apart); removing the twist plug in the access hole (located top center of the housing cover); and inserting the supplied 9/16" socket in the access hole, over the drive hex head to rotate the socket clockwise to retract and counter clockwise to extend. When the manual operation is completed, remove the socket, replace the twist plug, and reassemble the fuse connection. Recalibration must be performed before resuming normal operation.

Calibration

The jack is calibrated at the factory and is ready for use when taken out of the box. If the jack has been manually operated, serviced or if the jack is suspected to be out of calibration for whatever reason, then user should recalibrate the travel limits. To calibrate the travel limits of the jack, follow these steps:

1. Press and hold Extend/Retract button for three (3) seconds and GREEN light will flash three (3) times indicating both buttons are pushed.

2. After three (3) seconds the WHITE light will flash indicating the jack is in calibration mode. Press Extend or Retract button so that the end of the outer tube is located on the top edge of the calibration hole (see parts list view).
3. Press and hold LIGHT button until WHITE light goes off indicating that the jack is now calibrated. After the white light goes off, the jack will immediately move (up or down about ⅜") to set the location sensor. The calibration hole should not be visible after the location sensor has set.
4. Jack is now ready to use by pushing Extend or Retract buttons.
5. User can also determine if the jack is out of calibration by operating the jack to Extend/Retract limit to see if the outer tube is extended beyond one of the two travel limit indicator holes in the inner tube facing toward the tow vehicle. If the outer tube travels beyond these preset holes—STOP—the jack immediately.

Memory Button

The memory button remembers the height location for hooking and unhooking from tow vehicle. The height location can be determined by several techniques including one or more reference marks on the jackscrew; counting rotations of the jackscrew, or time that the motor is engaged.

While unhooking from the tow vehicle, Extend/Retract the jack to the desired location that allows the coupler to clear the hitch ball and unhook the trailer from the tow vehicle. This is the position that jack will return to while hooking back up to the tow vehicle by following these steps:
1. Push and hold the RED Memory Button for three (3) seconds and the GREEN light flashes three (3) times to set the memorized position of the jack at the desired height.
2. Once the Memory position has been set, pushing the RED Memory button will take the jack to the memorized location.
3. Once the jack is traveling to the memory location and user wants to stop the jack for whatever reason, press the memory button again and the jack will stop. To resume the memory function, press the memory button and the jack will proceed to the memory location.
4. Otherwise, use the Extend and Retract buttons to operate the jack. The memory button should only be used to set the memory The following example element list is provided for convenience in referencing the figures.

ELEMENT LIST

The following element numbers are provided for convenience for reviewing FIGS. 1-6.
electric tongue jack 80 (PRIOR ART)
main gear cover 82
motor housing 83
light lens 84
light switch 85
motor switch 86
outer tube 87
tongue 88
electric tongue jack 101
light 102
touch pad 104
mounting flange 106
tongue 108
footpad 110
jackscrew assembly 200
outer tube assembly 220
outer tube 230
inner tube assembly 240
inner tube 242
jack drive nut 250
jackscrew 260
lower stem assembly 300
memory button 50
collar 302
gear box 304
outer tube 230
wire lock pin 306
adjustable footpad 110
inner tube 242
ball screw set 308
clutch assembly 310
friction washer 312
motor gear assembly 400
twist plug 402
housing cover 404
circuit board 406
gear box cover 408
drive gear 410
bevel gear assembly 412
light 414
motor 416
lens 84
motor housing 83
keypad 418
wiring 500
circuit board 406
keypad 418
memory button 50
LED light 502
motor 416
battery 70
fuse 505
fuse holder 506
control panel 600
red/green calibration indicator light 502
light switch 85
extend button 640
retract button 641

DETAILED DESCRIPTION OF EMBODIMENT second memory button In this embodiment, a second memory button is provided to automatically fully retract the jack.

Both memory buttons are designed for convenience and time savings when hitching and unhitching the tow vehicle from the trailer. Once both memory buttons are set all the user has to do is push two buttons to unhitch/hitch the trailer to the tow vehicle and to retract the jack leg. Once the tow vehicle is unhitched, the user has to level the trailer if necessary, by pushing the extend or retract button on the touch pad to level the trailer. The memory buttons and the software that controls them will make trailer set up dramatically more easy and convenient.

It is to be understood that the specific embodiments and examples described above are by way of illustration, and not limitation. Various modifications may be made by one of ordinary skill, and the scope of the invention is as defined in the appended claims.

What is claimed is:
1. A method of operating an electric tongue jack comprising
providing an electric tongue jack comprising
a jackscrew,
a hitch, and a motor gear assembly configured to activate the jackscrew to raise or lower the hitch relative to a jackscrew support surface, the motor gear assembly comprising
an extend control configured to raise the hitch relative to the jackscrew support surface, and
a retract control configured to raise the hitch relative to the jackscrew support surface;
providing a first memory button;
setting a memorized position of the jackscrew by engaging the first memory button at a first time when the hitch is at a first desired height above the jackscrew support surface, thereby determining and storing a first desired height of the hitch above the jackscrew support surface;
engaging the first memory button at a second time, and thereby controlling the motor gear assembly to operate the jackscrew to raise or lower the hitch to the first desired height of the hitch above the jackscrew support surface.

2. The method of claim 1 wherein determining and storing a first desired height of the hitch above the jackscrew support surface further comprises
engaging the extend control to raise the hitch;
engaging the first memory button to stop the travel of the hitch when the hitch is raised to the desired first height.

3. The method of claim 2 further comprising
re-engaging the first memory button to continue the travel of the hitch to the desired height.

4. The method of claim 1 further comprising
providing a second memory button; and
engaging the second memory button to automatically fully retract the jack.

5. A method of operating an electric tongue jack comprising
providing an electric tongue jack comprising
a jackscrew,
a hitch, and
a motor gear assembly configured to activate the jackscrew to raise or lower the hitch relative to a jackscrew support surface, the motor gear assembly comprising
an extend control configured to raise the hitch relative to the jackscrew support surface, and
a retract control configured to raise the hitch relative to the jackscrew support surface;
providing an extend control for the motor gear assembly;
providing a retract control for the motor gear assembly;
determining a first desired height of the hitch relative to the jackscrew support surface at a first time;
storing the first desired height of the hitch;
recalling the first desired height of the hitch at a second time, and
controlling the motor gear assembly to operate the jackscrew to raise or lower the hitch to the desired height of the hitch.

6. The method of claim 5 further comprising
determining a fully retracted height;
storing the fully retracted height; and
recalling the fully retracted height at a third time and controlling the motor gear assembly to operate the jackscrew to raise the hitch to the fully retracted height.

7. The method of claim 5 wherein storing the first desired height of the hitch further comprises
providing a first memory button; and
engaging the first memory button at the first time to store the first desired height of the hitch.

8. The method of claim 7 further comprising
engaging the first memory button at the second time to control the motor gear assembly to operate the jackscrew to raise or lower the hitch to the first desired height of the hitch.

9. The method of claim 6 further comprising providing a second memory button; and
engaging the second memory button at the third time to automatically fully retract the jack to the fully retracted height.

* * * * *